United States Patent [19]

Chow

[11] Patent Number: 5,263,313
[45] Date of Patent: Nov. 23, 1993

[54] CIRCULAR INTERNAL THRUST ENGINE

[76] Inventor: Andrew W. Chow, 15514 Fawn Villa, Houston, Tex. 77068

[21] Appl. No.: 892,111

[22] Filed: May 26, 1992

Related U.S. Application Data

[63] Continuation-in-part of Ser. No. 615,596, Nov. 19, 1990, abandoned.

[51] Int. Cl.⁵ .................................................. F02C 3/14
[52] U.S. Cl. ................................ 60/39.34; 60/39.43; 60/39.75
[58] Field of Search ............. 60/39.162, 39.35, 39.43, 60/39.75, 268, 39.34; 415/77, 79

[56] References Cited

U.S. PATENT DOCUMENTS

| | | | |
|---|---|---|---|
| 1,960,810 | 5/1934 | Gordon | 60/39.35 |
| 2,460,523 | 2/1949 | Moller | 60/39.36 |
| 2,471,892 | 5/1949 | Price | 60/268 |
| 2,670,597 | 3/1954 | Villemejane | 60/39.35 |
| 2,917,895 | 12/1959 | Boushey | 60/39.35 |
| 2,929,207 | 3/1960 | Peterson | 60/268 |
| 3,077,075 | 2/1963 | Turanciol | 60/39.35 |
| 3,422,625 | 1/1969 | Harris | 60/268 |
| 4,159,624 | 7/1979 | Gruner | 60/268 |

FOREIGN PATENT DOCUMENTS

| | | | |
|---|---|---|---|
| 0150190 | 10/1937 | Austria | 60/39.35 |
| 0863484 | 4/1941 | France . | |
| 0820337 | 9/1959 | United Kingdom | 60/39.35 |

*Primary Examiner*—Richard A. Bertsch
*Assistant Examiner*—Howard R. Richman

[57] ABSTRACT

The main part of this engine is a rotor (20), driven by circular and tangential fluid flow. Coupled with a counter rotator (30) and stator (40), more work is extracted from the fluid flowing out of the rotor. In application as a gas burning engine, a compressor section is added and is attached to the rotor and counter rotator. Because of the circular and tangential direction of fluid flow, the bulk of the energy of the fluid is converted to rotation and torque, resulting in minimum thrust being generated directly by the engine; however, the rotation and torque produced by the engine could be used to produce thrust.

3 Claims, 4 Drawing Sheets

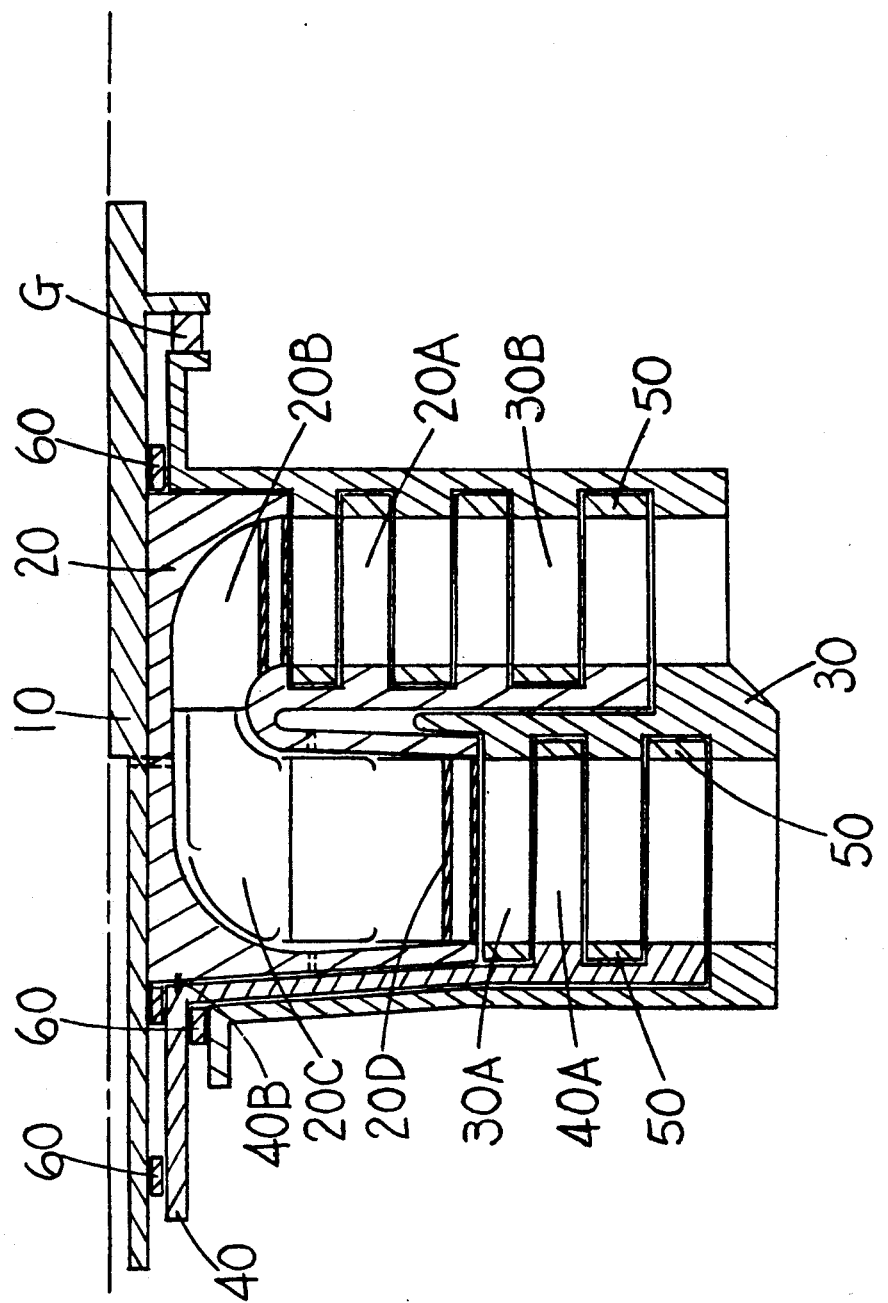

CIRCULAR INTERNAL THRUST ENGINE

This is a continuation-in-part of Ser. No. 07/615,596, filed Nov. 19, 1990, now abandoned.

The new engine/invention operates on Circular Internal Thrust, hereinafter CIT, by extracting energy from circularly and radially flowing pressurized fluid, and from circularly and axially flowing fluid in some applications, naturally producing opposite/counter rotations as a result of the reaction from and of the impulse force of the moving fluid.

DISCUSSION OF CURRENT ENGINE TECHNOLOGY

Despite general acceptance, the internal combustion engine has many disadvantages, including a large number of moving parts, substantial friction, relatively low efficiency, excessive weight, and limited time of power generation for each cycle of combustion.

The jet engine has revolutionized air travel; however, it has some inherent drawbacks. A simple jet engine is inefficient for slow flying largely because the force resulting from the reaction to the exhaust gas is not fully utilized. From physics, work is performed by a force pushing over a distance, and limited work is performed by the jet engine when the airplane travels only a short distance over time. To counter this phenomenon, jet engines have been improved by the addition of extra turbines which extract energy from the jet's exhaust in order to generate the necessary rotary power for turning a fan, or a propeller through a gear box, to increase thrust.

Current jet engine technology is based on fluid flow in the axial direction to produce power. To maintain optimal efficiency, the angle and shape of each turbine blade must change with distance away from the axis of rotation. While the shape of each turbine blade may be optimized for a given engine design, current turbojets have not overcome the efficiency loss at speeds other than the design speed. Furthermore, the twisted three-dimensional turbine blades must be fabricated individually at relatively high cost. Although the high production cost may be justified for airplanes, it is uneconomical to use jet engines in most other applications, with notable exception in electrical power generation.

Besides being expensive, jet engines are technically inferior to internal combustion engines for many applications with lower power requirements. In addition to the previously mentioned efficiency degradation at speeds other than the design speed, it is impractical to build a small jet engine. For low power needs, the size of the jet engine must be reduced, and with a smaller diameter the high-speed exhaust forces the shaft to turn at a high rotational speed, making it difficult to reduce to a useful range—for powering a car for example. Corresponding to the smaller diameter is a reduction in torque. Furthermore, the reactive force, or thrust, is largely wasted at low vehicle speeds as the work performed by the force is small due to the short distance over which the reactive force is applied. In other words, fuel is wasted in the form of high kinetic energy of the exhaust.

OBJECTIVES AND ADVANTAGES OF THE INVENTION

The following is claimed as objectives and advantages of the current invention to provide an engine which transforms the reaction from moving fluid directly to usable rotational power and torque, to provide an engine with favorable operating characteristics over a great range of engine speeds, to provide an engine with circular and radial fluid flow to permit efficient two dimensional turbine blades, thus facilitating the casting of an entire set of turbine blades in one pass, or the cutting of each blade from extrusions, to provide an engine that counter-rotates naturally, to provide an engine with theoretical efficiency exceeding those of current jet engines, to provide an engine that is economically competitive for applications requiring less power than airplanes or electrical power generation, for example, in ground transportation and marine uses, and to provide an energy efficient engine.

Furthermore, the following is claimed as additional objectives and advantages of this invention: to provide a counter-rotating engine that could replace conventional turbofan and turboprop engines in some applications, and to provide an engine that generates power with fluid from an external source, e.g., steam from a boiler.

DESCRIPTION OF DRAWINGS

FIG. 2 shows one form of the CIT engine with the engine driven by circular and radial fluid flow;

DEVELOPMENT OF THE CIT CONCEPT

Figure 1A:
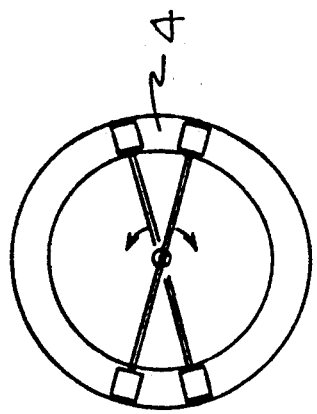
FIG. 1 A-E shows the development of the CIT concept.

The CIT concept started from a rotary internal combustion engine. FIG. 1A shows the conceptual rotary engine with two pistons 1 that could rotate in a donut shape combustion chamber and with removable shutters 2 that could seal the donut combustion chamber to provide the equivalent of a conventional cylinder head. The ignition of fuel with air injected between the pistons 1 and the shutters 2 would cause the piston assembly to turn around the axis of the engine, with the rotation designated by the arrow in FIG. 1A. There are some intrinsic properties of this "donut" engine that are better than conventional internal combustion engines. The most obvious attribute is no reciprocal motion. Furthermore, each piston can produce one "power stroke" each time it passes a shutter. Thus a two-piston rotary engine produces four "power strokes" per revolution. For a four-piston rotary engine, there would be sixteen "power strokes" per turn, a significant improvement over current two or four-stroke internal combustion engines.

The operating characteristics of this conceptual rotary engine may be impressive, but there are many engineering and design challenges from concept to reality. A difficult obstacle to overcome is the design of the shutters To circumvent this hurdle, two shutterless engines bridge the gap from the rotary "donut" to the CIT concept.

Figure 1B:
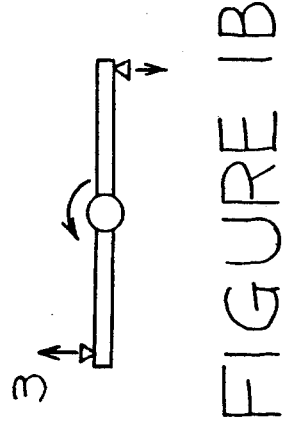

FIG. 1B shows the first bridge model, a rotary engine like before except the pistons are turned into jet propulsion nozzles 3, pointed tangentially away. The nozzle assembly rotates counter clockwise in reaction to the exhaust gas moving away from the nozzles. This is the same effect as seen in some fireworks displays.

Figure 1C:
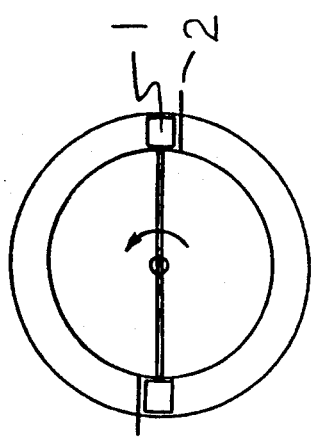

FIG. 1C shows the second bridge model, a modified "donut" engine with two sets of pistons turning in the same combustion chamber. The combustion of fuel between the pistons 4 forces the two sets of pistons apart. However, the unfortunate and obvious drawback of this model is the difficulty in keeping the two sets of pistons apart. If they turn in the same combustion chamber, the resultant motion has to be reciprocal.

Figure 1D:
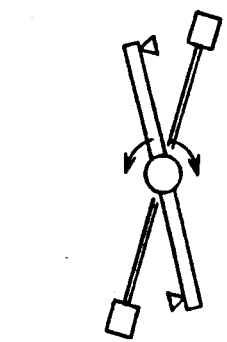

FIG. 1D shows the evolution of the CIT concept by combining the nozzles from FIG. 1B with a set of pistons similar to the ones from FIG. 1C. The nozzle assembly rotates counter clockwise as before. Positioning the pistons and their support properly, the exhaust from the nozzle could push the pistons away, causing the piston assembly to rotate clockwise, in opposite direction to the nozzles.

Figure 1E:
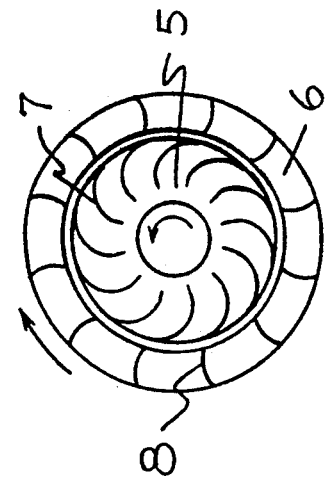

The performance of this model can be improved by increasing the number of nozzles and pistons. FIG. 1E shows the limiting case with the nozzle assembly being replaced by the CIT rotor 5 and the piston assembly being replaced by the counter rotator 6. In this CIT engine, gas combustion takes place inside the CIT rotor 5, and the exhaust is guided by the combustor vanes 7 and pointed tangentially away from the CIT rotor 5. The movement of the exhaust gas causes the CIT rotor 5 to turn in a counter clockwise direction. The exhaust pushes the counter rotator turbine blades 8 and causes the counter rotator 6 to turn clockwise in the opposite direction.

DESCRIPTION OF INVENTION

Based on the described concept, FIG. 2 shows the radial-flow form of the CIT engine. The engine includes a shaft 10 at the center, a CIT rotor 20, a counter rotator 30, and a power turbine stator 40. Half of the shaft 10 is shown along the center line. Fuel for combustion in the CIT rotor 20 is supplied through the hollow end of shaft 10 which is rigidly attached to CIT rotor 20.

Figure 3A:
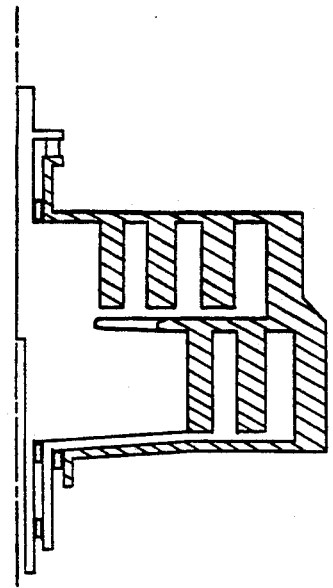
FIG. 3 A-C shows the various assemblies of the CIT engine.
Figure 3B:
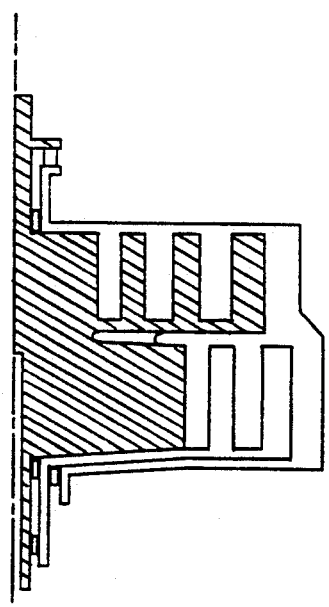
Figure 3C:
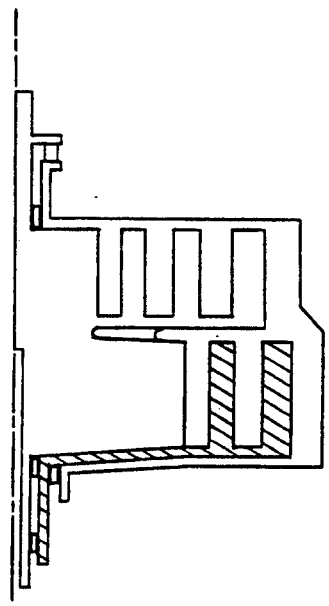

The entire CIT rotor assembly is shown in FIG. 3A. FIG. 3B shows the entire counter rotator assembly, and FIG. 3C shows the entire power turbine stator assembly. All three assemblies share the same center line. When the engine is not in operation and without the schematically illustrated gears G in FIG. 2, the entire CIT rotor assembly shown in FIG. 3A and the entire counter rotator assembly shown in FIG. 3B may rotate independently of each other around the center line, clockwise or counter clockwise. The power turbine stator is held stationary by external support not shown in either FIG. 2 or 3C.

The CIT rotor 20 has rigidly connected to it a number of impeller vanes 20B, an annularly-shaped gas combustor 20C for burning the fuel with compressed intake gas for producing exhaust gas, and a number of combustor vanes 20D for directing the exhaust tangentially away from the CIT rotor 20. The impeller vanes 20B are composed of a number of circumferentially spaced vanes which compress the intake gas and force the gas to rotate with the CIT rotor 20. After the gas flows into the gas combustor 20C, fuel is injected for combustion. Then the gas flows by the combustor vanes 20D, which are comparable to the combustor vanes 7 in FIG. 1E.

With the combustor vanes 20D positioned in the same orientation as the combustor vanes 7 in FIG. 1E when the engine in FIG. 2 is viewed from the end with the hollow shaft, the reaction from the exhaust gas leaving the gas combustor 20C and guided by the combustor vanes 20D causes the CIT rotor 20 and the entire CIT rotor assembly shown in FIG. 3A to rotate counter clockwise around the center line when viewed from the hollow end of the shaft. Thus mechanical work is extracted from the exhaust gas. The power produced is proportional to the mass flow through the combustor vanes 20D, and work measured by force pushing over a distance can be extracted efficiently over a great range of engine speeds.

The exhaust gas, moving tangentially away from the CIT rotor 20, pushes the counter rotator power turbine blades 30A, therefore causing the counter rotator 30 and the entire counter rotator assembly shown in FIG. 3B to rotate opposite to the rotation of the CIT rotor 20. With the orientation of the combustor vanes 20D as previously described and with the counter rotator power turbine blades 30A positioned in the same orientation as the counter rotator turbine blades 8 in FIG. 1E when viewed from the end of the engine with the hollow shaft, the counter rotator 30 and the entire counter rotator assembly shown in FIG. 3B would rotate clockwise around the center line when viewed from the end of the engine with the hollow shaft. The exhaust gas flows through and is redirected by the stationary power turbine stator blades 40A, therefore permitting more work to be extracted by the outer rings of counter rotator power turbine blades 30A.

A number of rings of counter rotator power turbine blades 30A are rigidly attached to the counter rotator 30; each ring contains a number of counter rotator power turbine blades 30A that are spaced circumferentially and aligned axially. Attached to the power turbine stator 40 is a number of rings of power turbine stator blades 40A; each ring contains a number of power turbine stator blades 40A that are spaced circumferentially and aligned axially. The rings attached to the counter rotator 30 are interdigitated with the rings attached to the power turbine stator 40.

Circumferentially spaced electrical breaker points 40B extend from the power turbine stator 40 to the CIT rotor 20, providing electricity for electronic ignition in the gas combustor 20C. The power turbine stator 40 is rotatably mounted on bearings 60 over the shaft 10.

Attached to the counter rotator 30 is a number of rings of counter rotator compressor blades 30B; each ring contains a number of circumferentially spaced and axially aligned counter rotator compressor blades 30B. Attached to the CIT rotor 20 is a number of rings of CIT rotor compressor blades 20A; each ring contains a number of circumferentially spaced and axially aligned CIT rotor compressor blades 20A. The rings attached to the counter rotator 30 are interdigitated with the rings attached to the CIT rotor 20. Opposite rotations between the CIT rotor compressor blades 20A and the counter rotator compressor blades 30B efficiently compress intake gas for combustion in gas combustor 20C. Counter rotator 30 is rotatably mounted on bearings 60 over power turbine stator 40 and shaft 10.

The ends of each inner ring of counter rotator power turbine blades 30A and counter rotator compressor blades 30B, the ends of each ring of CIT rotor compressor blades 20A, and the ends of each ring of power turbine stator blades 40A are attached to stress rings 50 to reduce the bending stress in the blades from operation at high speed, especially from the inertial forces generated by the rotation of the CIT rotor 20 and counter rotator 30. For maximum effect, the stress rings 50 could be prestressed by shrink fit. There is no stress ring on the outermost ring of counter rotator Compressor blades 30B or counter rotator power turbine blades 30A as the blades in these rings are rigidly connected on both ends.

Figure 4:
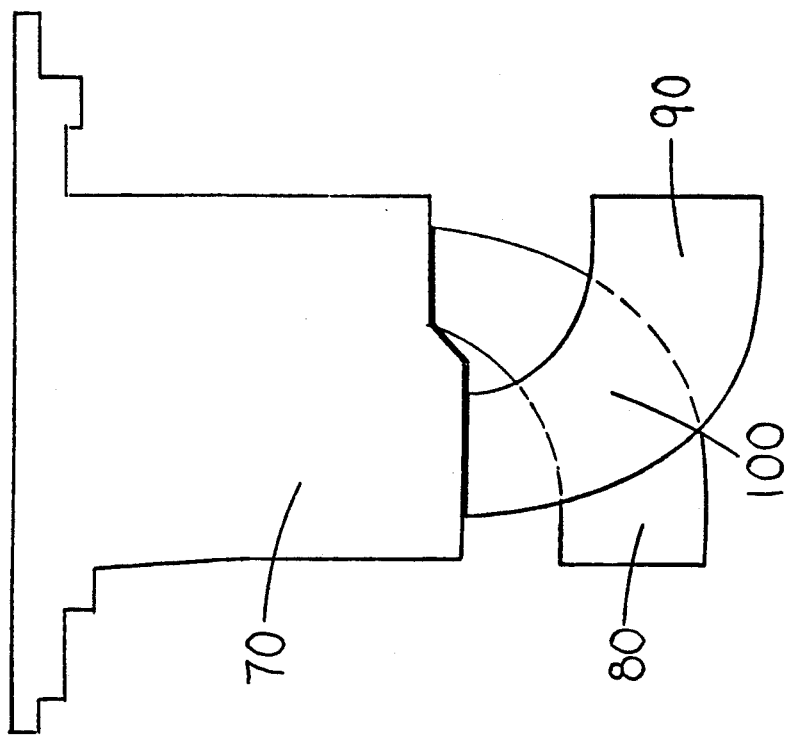
FIG. 4 shows the schematics of a heat exchanger for the engine illustrated in FIG. 2.

FIG. 4 shows the schematics of a heat exchanger 70 for improving the efficiency of the engine shown in FIG. 2. The heat exchanger 70 is composed of a number of circumferentially spaced intake ducts 80 and a number of circumferentially spaced exhaust ducts 90. The intake ducts 80 and the exhaust ducts 90 are interdigitated, and heat is transferred from the exhaust to the intake across a common wall shown as the overlapped portion 100. The heat exchanger may be stationary or be rigidly attached to the counter rotator 30. The geometry of the ducts would depend on whether the heat exchanger is stationary or rigidly attached to the counter rotator 30.

The heat exchanger lowers the exhaust temperature, thus raising the efficiency of the engine. Also, because of the internal rotation, the velocity of the exhaust is reduced even before it flows past the first ring of turbine blades. Therefore, the CIT engine extracts more kinetic energy than conventional jet engines. Finally, the expansion of the combustion gas in a circumferential direction provides for optimal momentum transfer in the direction of motion and maximizes torque. In summary, this invention is more efficient than current jet engines. Most of all, circumferential and radial flows permit the use of axially aligned turbine blades with geometry that varies only in two dimensions, in the plane of rotation.

The shaft 10 and counter rotator 30 can be connected to and thereby directly drive counter rotating propellers or fans. In some other applications, such as ground transportation, the rotation of the shaft 10 and counter rotator 30 may be linked mechanically by the gears G shown schematically in FIG. 2, thus permitting the CIT engine to connect either at shaft 10 or counter rotator 30 to a torque converting device such as an automotive transmission. The gear ratio is selected to ensure that the assembly not directly connected to the torque converting device is always pushing the other assembly that is connected externally.

It would be clear to those knowledgeable of the arts that the CIT engine is not limited to the embodiment shown in FIG. 2. An obvious variation is for fluid flow primarily in the axial direction like conventional jet engines. Another variation is a CIT engine driven by external power source, such as steam from a boiler or water from a dam. In this case, the engine would not need the compressor section, gas combustor, fuel supply, and electronic ignition, and the combustor vanes should then be renamed as rotor vanes.

It should be noted that the size, shape, and proportion are shown to illustrate how Circular Internal Thrust and counter rotations are produced by directing the fluid in a CIT rotor to flow in a circumferential direction and by capturing the momentum of the escaping fluid with a counter rotator.

SUMMARY OF THE INVENTION

It would be clear to those skilled in the arts that this invention is a novel fluid-drive machine. The rotor efficiently transforms the physical reaction to fluid flow into rotation. Fluid movement is directed tangentially and circumferentially away from the motor, and torque is maximized because the force is applied perpendicular to the radius of the rotor, perfectly aligned for the engine form shown in FIG. 2. Because of the rotor's rotation, the absolute velocity of the fluid exiting the rotor is reduced, reflecting that substantial work has been extracted from the fluid.

More work is efficiently extracted by the counter rotator. Viewed from the counter rotator, the fluid movement from the rotor is aligned for optimal momentum transfer for rotation in the opposite direction. In comparison with conventional jet engines or turbines, less kinetic energy is wasted; jet engines convert energy from axial fluid flow to rotation with turbine blade movement normal to the flow, and jet engines can not convert a substantial portion of the kinetic energy into rotation or torque. For greater improvement, the heat exchanger from FIG. 4 further enhances the efficiency of the engine by recovering residual heat from the exhaust.

Finally, radial and circular fluid flow permit the use of optimal turbine blades with geometry that varies only in two dimensions in the plane of rotation. Therefore, the manufacturing cost of the turbine blades would be less than those requiring three-dimensional variable geometry. The CIT engine is more energy efficient than conventional jet engines and should be economically competitive for marine, ground transportation, and other applications.

I claim:

1. A Circular Internal Thrust engine comprising:
   a rotor for internal fluid flow;
   a plurality of impeller vanes;
   a gas combustor rigidly attached to said rotor;
   a plurality of combustor vanes; and
   a counter rotator which includes one or more rings of power turbine blades;
   with said impeller vanes effective for ensuring that internal fluid rotates with said rotor;
   with said gas combustor, rotating with the rotor, capable of generating combustion gas;
   with said combustor vanes effective for directing fluid away from the rotor, causing the rotor to turn;
   with said counter rotator coaxially aligned with the rotor; and
   with said power turbine blades effective in extracting energy from fluid expelled from the rotor, causing the counter rotator to rotate opposite to the rotation of the rotor.

2. An engine according to claim 1, further comprising:
   a plurality of rings of compressor blades attached to and turned by the rotor; and
   a plurality of rings of compressor blades attached to and turned by said counter rotator;
   with said rings of compressor blades attached to the rotor interdigitated with said rings of compressor blades attached to the counter rotator; and
   with the compressor blades attached to both rotor and counter rotator effective for compressing intake gas for combustion in said gas combustor.

3. An engine according to claim 1, further comprising:
   a stator which includes one or more rings of stator blades;
   with said stator coaxially aligned with said rotor and said counter rotator;
   with the stator held stationary by external support;
   with said ring or rings of the stator interdigitated with said rings of power turbine blades of the counter rotator; and
   with said stator blades of the stator effective in redirecting fluid expelled from the rotor and flowing through the counter rotator power turbine blades to permit more energy to be extracted by subsequent rings of counter rotator power turbine blades.

* * * * *